United States Patent Office 2,875,259
Patented Feb. 24, 1959

2,875,259

PRODUCTION OF ACETYLENE USING METHANE

Hans Klein, Mannheim, Germany, assignor to Badische Anilin- & Soda-Fabrik Aktiengesellschaft, Ludwigshafen (Rhine), Germany No Drawing. Application July 24, 1956
Serial No. 599,694

Claims priority, application Germany July 29, 1955

1 Claim. (Cl. 260—679)

The present invention is related to improvements in the production of acetylene by reaction of methane with amounts of oxygen insufficient for complete combustion of the methane.

The prior processes for the production of acetylene from methane and oxygen which have found industrial application, have been based on separately heating the two gases, mixing them in the hot state and supplying the mixture to the reaction chamber. Hitherto it has in general been thought that a common heating, which would be simpler, could not be carried out on a technical scale because in preheaters of metallic materials, which are indispensable in practice, undesirable side reactions would occure due to the action of the metallic surface of the preheater.

In more recent times a process has been proposed by which it is possible to heat methane and oxygen together for the purpose of the production of acetylene; a very high linear velocity of the gas mixture must be maintained in the preheater, amounting for example to 450 metres per second. The use of such high speeds of flow, however, has several disadvantages. For one thing the life of the preheater is greatly reduced because it is a question of supersonic speeds at temperatures of more than red heat. Then again the process requires a considerable pressure in order to drive the gas mixture through the tubes of the preheater at this speed. Since the mixture in question is inflammable, working under pressure is not without danger, especially in the case of occasional disturbances, apart from the fact that the compression represents an increase in cost.

The object of my present invention is a process which is free from the said disadvantages. The process comprises mixing the initial gases at temperatures below 500° C., preferably at room temperature, heating the mixture while maintaining a small linear velocity amounting to up to 10 metres per second in metallic preheaters to temperatures above 600° C., advantageously from 700° to 750° C., and care being taken that the inner wall of the preheater, at least that part of it which is heated to temperatures above 550° C., is smooth and that between the entry of the mixture into the preheater and its exit a very small pressure difference amounting to less than 0.1 atmosphere is maintained.

The preheating is preferably effected in tubes of which the walls consist of steel with a content of more than 10%, advantageously more than 20%, of chromium. These tubes should have a smooth internal surface and if they are not sufficiently smooth by reason of their method of manufacture, they are ground or polished.

It is preferable to use preheaters which have a relatively large internal wall surface per unit of volume. This surface should preferably amount to more than 0.06, preferably more than 0.08, square metre per litre of heater space. If the dimensions of the heating apparatus do not fulfill this requirement, for example when thick tubes or channels are used, the large wall surface can be produced by arranging within the preheater filling bodies of metal or of ceramic material, which may also be hollow. Preheaters of the shape of tubular bundle heat exchangers may also be used.

Since difficulties are to be expected in the common heating up of methane and oxygen mainly at temperatures above 550° C., it is sufficient to use at these temperatures preheaters with a smooth and large internal surface. This has the advantage that the resistance to flow in the first, colder part of the apparatus is relatively low.

A further expedient for facilitating the common heating up of methane and oxygen consists in maintaining a slight temperature difference between the wall of the preheater and the mixture flowing through the preheater, so that in the region of the maximum temperature of the mixture this difference in temperature is not more than about 50° C. This is of special importance in the temperature range above 550° C.

In order to prevent iron oxide from exerting a premature catalytic influence on the reaction, care is taken, for example by means of a filter, that iron oxide cannot pass from the supply pipes into the preheater.

For the rest, the conversion of the preheated mixture to acetylene is carried out in the usual way. Extraneous gases or vapors, for example nitrogen or water vapor, can be added to the mixture of methane and oxygen. The supply of the hot gas mixture to the reaction chamber is also effected in the usual way. It is not necessary, however, to use a specially constructed burner, but the mixture can also be led directly into the reaction chamber through tubes or perforated plates. It is preferable to cool the tubes in the neighborhood of the outlet.

The following examples will further illustrate this invention but the invention is not restricted to these examples.

*Example 1*

A mixture of 100 litres of methane and 50 litres of oxygen is heated per hour in an internally-smooth tube of 15 millimeters internal width and having a wall thickness of 1.6 millimeters, which consist of a steel containing 18% of chromium, with the aid of an electrical heating. The heating is so controlled that for a length of 36 centimetres the maximum temperature of the gas mixture amounts to 690° C., whereas at the external wall of the tube the maximum temperature of 720° C. prevails. The oxygen content of the mixture is reduced by only 0.2% by passage through the tube, i. e. there is practically no oxidation. From the preheater the gas mixture passes into a conventional reaction chamber in which it is converted into acetylene. Acetylene is obtained in a yield which is about 3% higher than that obtained by using the same methane and oxygen and preheating them separately and mixing the gases at about 640° C. according to known methods.

*Example 2*

A mixture of 100 litres of methane and 50 litres of oxygen are led per hour through a tube of the same dimensions as described in Example 1, constructed of a steel having a chromium content of 23% and having an inner surface which has been polished. The heating of the mixture can be carried out up to a gas temperature of 740° C. and at a wall temperature of 780° C. without more than 0.2% of the oxygen being used up. Even when the temperature in the gas is raised to 760° C. and in the wall to 800° C., the oxygen consumption is only about 0.9%. The heated mixture is led into a reaction chamber in which acetylene formation takes place.

What I claim is:

In a process for the production of acetylene by reaction of methane with amounts of oxygen insufficient for complete combustion of the methane, the improvement which comprises mixing the methane and the oxygen at a temperature below 500° C., passing the mixture through a preheater having a metallic inner wall at a maximum linear velocity of about 10 meters per second, heating said mixture in said preheater to a temperatre above 600° C., maintaining a maximum temperature differential of about 50° C. between said inner wall and said mixture in the region of maximum temperature of said mixture, at least that part of the inner wall of the preheater which is heated to temperatures above 550° C. being smooth, and maintaining between the entry of the gas mixture into the preheater and its exit therefrom a pressure difference of less than 0.1 atmosphere.

References Cited in the file of this patent

UNITED STATES PATENTS

| | | |
|---|---|---|
| 2,679,543 | Dorsey | May 25, 1954 |
| 2,764,555 | Rees et al. | Sept. 25, 1956 |
| 2,765,359 | Pichler et al. | Oct. 2, 1956 |